United States Patent
Kim et al.

(10) Patent No.: US 9,258,727 B2
(45) Date of Patent: Feb. 9, 2016

(54) METHOD AND APPARATUS FOR GENERATING AND REPORTING CHANNEL MEASUREMENT INFORMATION IN WIRELESS COMMUNICATION SYSTEM

(75) Inventors: Sang-Bum Kim, Seoul (KR); Soeng-Hun Kim, Gyeonggi-do (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 150 days.

(21) Appl. No.: 13/985,555

(22) PCT Filed: Feb. 14, 2012

(86) PCT No.: PCT/KR2012/001088
§ 371 (c)(1),
(2), (4) Date: Aug. 14, 2013

(87) PCT Pub. No.: WO2012/111950
PCT Pub. Date: Aug. 23, 2012

(65) Prior Publication Data
US 2013/0329593 A1    Dec. 12, 2013

(30) Foreign Application Priority Data
Feb. 14, 2011    (KR) .................. 10-2011-0012859

(51) Int. Cl.
*H04W 24/10*    (2009.01)
*H04W 24/08*    (2009.01)
*H04W 64/00*    (2009.01)

(52) U.S. Cl.
CPC .............. *H04W 24/10* (2013.01); *H04W 24/08* (2013.01); *H04W 64/00* (2013.01)

(58) Field of Classification Search
CPC ..... H04W 24/10; H04W 24/08; H04W 64/00; H04W 64/006
See application file for complete search history.

(56) References Cited

U.S. PATENT DOCUMENTS 8,838,091 B2 *  9/2014  Jung et al. ................. 455/423
8,948,778 B2 *  2/2015  Burroughs et al. ........ 455/456.1
(Continued)

FOREIGN PATENT DOCUMENTS

| KR | 10-2009-0095671 | 9/2009 |
| KR | 10-0966566 | 6/2010 |
| KR | 10-2010-0088085 | 8/2010 |

(Continued)

OTHER PUBLICATIONS

International Search Report dated Sep. 24, 2012 in connection with International Patent Application No. PCT/KR2012/001088.

(Continued)

*Primary Examiner* — Brian O'Connor

(57) ABSTRACT

The present invention pertains to a method for efficiently determining the validity of terminal location information in a minimization of drive test (MDT) measurement report procedure in a 3GPP system. The method for reporting channel measurement information of a terminal in a wireless communication system according to the present invention comprises: a reception step of receiving setup information for wireless channel measurement from a base station; an acquisition step of acquiring wireless channel information, location information of the terminal, and time information when the location information is collected according to the setup information; a determination step of determining whether the location information of the terminal is valid; and a transmission step of generating and transmitting channel measurement information including the time information to the base station when valid.

20 Claims, 9 Drawing Sheets

(56) References Cited

U.S. PATENT DOCUMENTS

| | | | |
|---|---|---|---|
| 8,965,393 B2* | 2/2015 | Bhattacharya | 455/456.1 |
| 2008/0062913 A1* | 3/2008 | Zander et al. | 370/320 |
| 2011/0034179 A1* | 2/2011 | David | G01S 5/0236 |
| | | | 455/456.1 |
| 2012/0252425 A1* | 10/2012 | Moeglein et al. | 455/418 |
| 2012/0315890 A1* | 12/2012 | Suzuki et al. | 455/422.1 |

FOREIGN PATENT DOCUMENTS

WO   WO 2010/145531 A1   12/2010

OTHER PUBLICATIONS

Written Opinion of International Searching Authority dated Sep. 24, 2012 in connection with International Patent Application No. PCT/KR2012/001088.

\* cited by examiner

METHOD AND APPARATUS FOR GENERATING AND REPORTING CHANNEL MEASUREMENT INFORMATION IN WIRELESS COMMUNICATION SYSTEM

CROSS-REFERENCE TO RELATED APPLICATION(S)

The present application claims priority under 35 U.S.C. §365 to International Patent Application No. PCT/KR2012/001088 filed Feb. 14, 2012, entitled "METHOD AND APPARATUS FOR GENERATING AND REPORTING CHANNEL MEASUREMENT INFORMATION IN WIRELESS COMMUNICATION SYSTEM". International Patent Application No. PCT/KR2012/001088 claims priority under 35 U.S.C. §365 and/or 35 U.S.C. §119(a) to Korean Patent Application No. 10-2011-0012859 filed Feb. 14, 2011 and which are incorporated herein by reference into the present disclosure as if fully set forth herein.

BACKGROUND OF THE INVENTION

1. Technical Field

The present disclosure relates to a channel measurement information generation and report method and apparatus of a terminal in a wireless communication system and, in particular, to a Minimization of Drive Test (MDT) measurement method and apparatus of a terminal in the connected mode in the $3^{rd}$ Generation Partnership Project (3GPP) system.

2. Background Art

The mobile communication system has been developed for the user to communicate on the move. With the rapid advance of technologies, the mobile communication system has evolved to the level capable of providing high speed data communication service as well as voice telephony service. Recently, as one of the next generation mobile communication system, Long Term Evolution-Advanced (LTE-A) is on the standardization by the $3^{rd}$ Generation Partnership Project (3GPP). LTE-A is expected to be ratified aims at very high peak data rate as compared to the legacy technology and its standard is expected to be ratified around late 2010.

With the evolvement of the 3GPP standard, many discussions are being conducted for optimizing the radio network in addition to the effort for increasing data rate. In the initial radio network configuration or optimization stage, a base station or a base station controller should collect radio environment information related to its own cell coverage, and this process is called Drive Test.

Since the conventional drive test is carried out by an operator manually with the test apparatus equipped on a vehicle on the move. The measurement result is analyzed for use in configuration of the system parameters of the base stations and base station controllers. However, conventional derive tests are time consuming and labor intensive to achieve radio network optimization.

DISCLOSURE OF INVENTION

Technical Problem

The disclosure provides an apparatus for determining validity of the terminal location information in the MDT measurement report process of the 3GPP system and, particularly, the apparatus and method for transmitting, at the TERMINAL in the connected mode, the location information acquisition time for use in verifying the validity of the TERMINAL location information.

Solution to Problem

In order to solve the above problem, a channel measurement information report method of a terminal in a wireless communication system includes receiving configuration information for radio channel measurement from a base station, acquiring radio channel information, terminal location information, and location information acquisition time information according to the configuration information, determining whether the terminal location information is valid, and transmitting, when the terminal location information is valid, the channel measurement information including the time information to the base station.

A terminal generating and reporting channel measurement information in a wireless communication system includes a transceiver which transmits and receives signals to and from a base station; a location information acquirer which acquires terminal location information; and a controller which controls acquiring radio channel information, terminal location information, and location information acquisition time information according to the configuration information, determining whether the terminal location information is valid, and transmitting, when the terminal location information is valid, the channel measurement information including the time information to the base station.

Advantageous Effects of Invention

According to the embodiment of the disclosure, the UE may report the MDT measurement information to the eNB as follows. It is configured to report the MDT measurement information periodically and, if the report interval is very short, the probability in which the GNSS location information matches or close to the UE location at the report timing, and thus including such time information increases signaling overhead and UE reports only the location information without time information selectively. In the second method, the UE, the UE includes the time information in the MDT measurement information only when the difference between the GNSS location information acquisition time and the report time is equal to or greater than a predetermined value so as to transmit the time information efficiently. In the third method, since the correlation between the UE location information and MDT measurement information report timing is closely related with the UE movement speed, it is possible to determine whether to including the location acquisition time in the MDT measurement information based on the UE speed. If the time information is included in the MDT measurement information, it is possible to reduce the size of the time information.

MODE FOR THE INVENTION

Exemplary embodiments of the disclosure are described with reference to the accompanying drawings in detail. The same reference numbers are used throughout the drawings to refer to the same or like parts.

Although the description is made with reference to numerous specific details such as MDT measurement information report interval, count period, and number of time information bits to provide a thorough understanding of embodiments of the disclosure, those skilled in the art will appreciate that the disclosure can be practiced without some or all of these specific details. Detailed description of well-known functions and structures incorporated herein may be omitted to avoid obscuring the subject matter of the disclosure.

The disclosure relates to an apparatus and method for verifying the validity of TERMINAL location information efficiently in MDT measurement report procedure. An embodiment of the disclosure proposes an apparatus and method for transmitting location information acquisition time for use in verifying the validity of the TERMINAL location information transmitted by the TERMINAL in the connected mode efficiently.

Recently, the 3GPP has been focusing on the minimization of Drive Test for collecting radio environment information of the cell coverage of base stations or base station controllers and improvement of radio environment analysis and manual configuration procedure, so called Minimization of Drive Text (MDT). The MDT information (hereinafter, the term 'MDT information' and 'MDT measurement information' are used interchangeably) may include radio channel measurement information and other supplementary information generated in the terminal. In the following description, the operation of transmitting, at the terminal, the radio channel measurement information and other supplementary information to the base station is referred to as MDT measurement information report. If it is capable of communicating with the base station (in the connected mode), the terminal reports the channel measurement result immediately and, otherwise, logs the channel measurement result and, when it enters the connected mode, transmit channel measurement result. Then the base station uses the MDT measurement information received from the terminal for cell area optimization.

Figure 1:
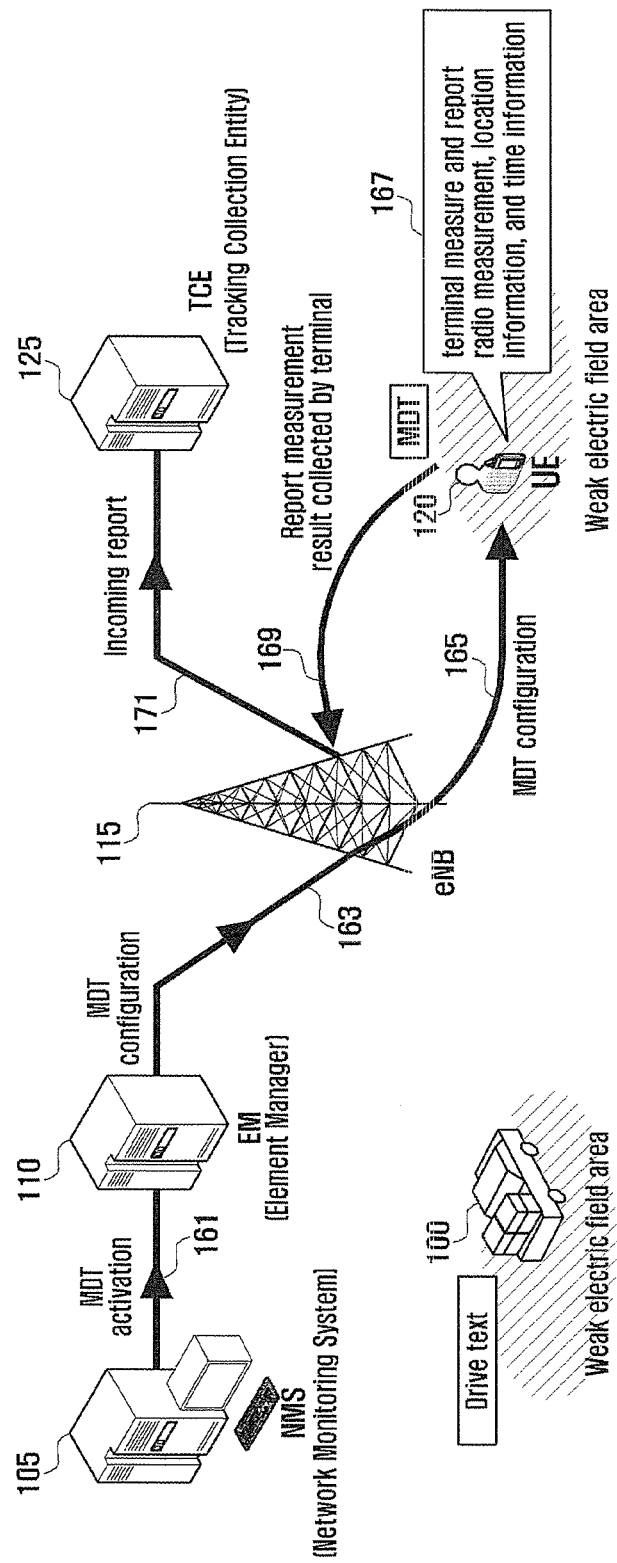
FIG. 1 is a diagram illustrating a concept of MDT according to an embodiment of the disclosure.

FIG. 1 is a diagram illustrating a concept of MDT.

Referring to FIG. 1, a drive test is performed with the test apparatus equipped on a vehicle roaming around weak coverage area in the service area. In MDT, however, the terminal 120 carries out the drive test instead. In FIG. 1, the Network Monitoring System (NMS) 105 may instruct to perform MDT (MDT activation) at operation 161 and provides the Element Manager (EM) 110 with the MDT configuration information. The EM 110 generates MDT configuration information to an evolved Node B (eNB) 115 at operation 163. Then the eNB 115 sends a User Equipment (UE) 120 the MDT configuration information to instruct to perform MDT at operation 165.

In response to the MDT instruction, the UE 120 collects MDT measurement information at operation 167. The collected MDT measurement information may include supplementary information such as location information and time information as well as signal measurement information (hereinafter, the term 'signal measurement information' is interchangeably used with the term 'radio channel measurement information'). At this time, the UE 120 collects the MDT measurement information in a weak coverage area within the service area. The UE 120 reports the collected MDT measurement information to the eNB 115. Then the eNB 115 sends the collected information to the Trace Collection Entity (TCE) 135 at operation 171. The TOE 135 is the server for collecting the MDT measurement information.

Figure 2:
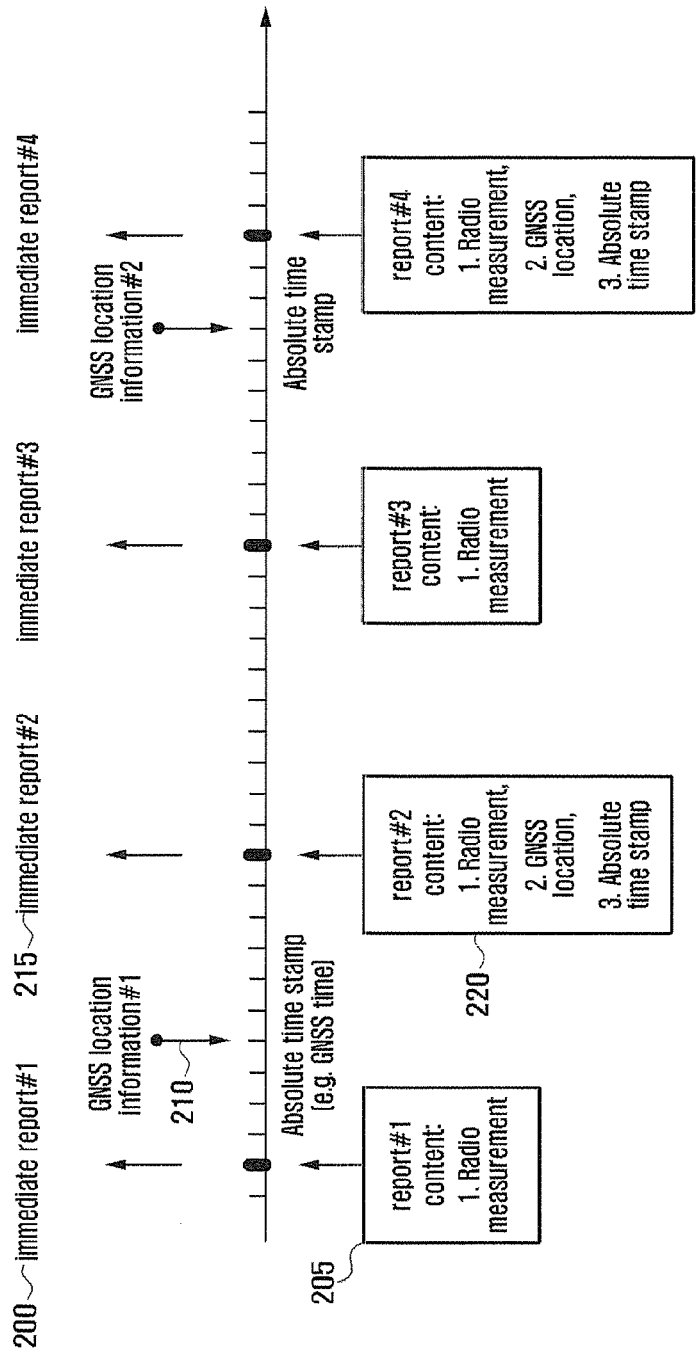
FIG. 2 is a timing diagram illustrating a principle of reporting MDT measurement information in the immediate MDT of the UE according to an embodiment of the disclosure.

The MDT is classified into one of an immediate MDT performed in the connected mode and a logged MDT performed in the idle mode. FIG. 2 is a timing diagram illustrating a principle of reporting MDT measurement information in the immediate MDT of the UE according to an embodiment of the disclosure.

Referring to FIG. 2, if it is configured to report periodically, the UE reports the collected MDT measurement information at a predetermined interval as denoted by reference numbers 200 and 215. If there is no Global Navigation Satellite Systems (GNSS) location information, the UE reports only the signal measurement information (radio channel measurement information) as denoted by reference number 215. If the GNSS location information is collected as denoted by reference number 210, the UE may report the MDT measurement information including the location information at the next report timing to the eNB as denoted by reference number 215. Here, it is not mandatory to include the location information in the MDT measurement information but the UE first determines the validity by itself. The validity of the location information is determined depending on the relationship between the location information and the MDT measurement information report timing. The eNB want to know the location of the UE when it reports the measurement information. If the difference between the location information acquisition time and report time is large, it is likely that the location information does not indicate the UE location at the time when the measurement information report is reported. Accordingly, when the difference between the location information acquisition and report times is large, the UE may not include the location information in the measurement information report. Whether to include the location information depends on UE implementation.

If it is determined to including the location information in the MDT measurement information, the UE also report the time when the location information is acquired as denoted by reference number 220. The location information may be acquired in collecting the GNSS location information. The time information reported along with the GNSS location information is used in determining, at the eNB, the validity of the location information. Although the UE reports the location information after determining its validity already, the eNB verifies the validity of the GNSS location information again based on the report time information. This time information may causes signaling overhead and thus has to be designed well. It may be inappropriate to include the location information in every report. In an exemplary case that the MDT measurement information report interval is very short, i.e. 120 ms in LTE, and GNSS is working, the GNSS location information may be transmitted every 120 ms. Since the report interval is very short, the GNSS location information is likely to be the UE location at the report timing. Accordingly, it may cause unnecessary signaling overhead to report the time information explicitly.

An embodiment of the disclosure proposes a method for reducing the time information signaling overhead without compromising location information validity verification capability.

An embodiment of the disclosure proposes a method for reporting the location information without time information selectively in MDT measurement report process. If it is configured to report the MDT measurement information periodically at a short interval, the reported GNSS location information is likely to match the UE location within a tolerable range. Accordingly, it may cause singling overhead to report the time information explicitly. Accordingly, when the report interval is less than a predetermined value (first threshold), there is little probability in which the validity of the location information drops and thus only the location information is reported without time information.

Another embodiment of the disclosure proposes a method of including the time information in the MDT measurement information only when the different between the GNSS location information acquisition time and report time is equal to or greater than a predetermined value (second threshold). Here, the predetermined value may be provided by the eNB.

Another embodiment of the disclosure proposes a method of determining whether to include the location information acquisition time in the MDT measurement information based on the analysis of UE's movement speed and a third threshold value. The correlation between the UE's location information and the MDT measurement information report time is closely related to the UE's movement speed. Although the different between the location information acquisition and report times is great, if the UE does not move, it is possible to regard the corresponding location information indicate the measurement information acquisition location. In contrast, although the time difference is small, if the UE moves fast, the validity of the location information drops. Accordingly, the UE speed may be used as one of the conditions to determine whether to include location information acquisition time in the MDT measurement information.

Still another embodiment of the disclosure proposes a method of reducing the size of the time information included in the MDT measurement information. That is, the method of reducing the time information overhead is to reduce the size of the time information. This embodiment proposes a method of defining an efficient time information size or providing the time information in a new aspect.

Embodiment 1

As described above, if it is configured to report the MDT measurement information periodically at a very short interval, the GNSS location information is likely to indicate the UE location at the report time within a tolerable range. If the time information for such case is reported explicitly, this is a signaling overhead. Since the location information validity is secured when the report interval is less than a predetermined value, it is appropriate to report only the location information without time information.

Figure 3:
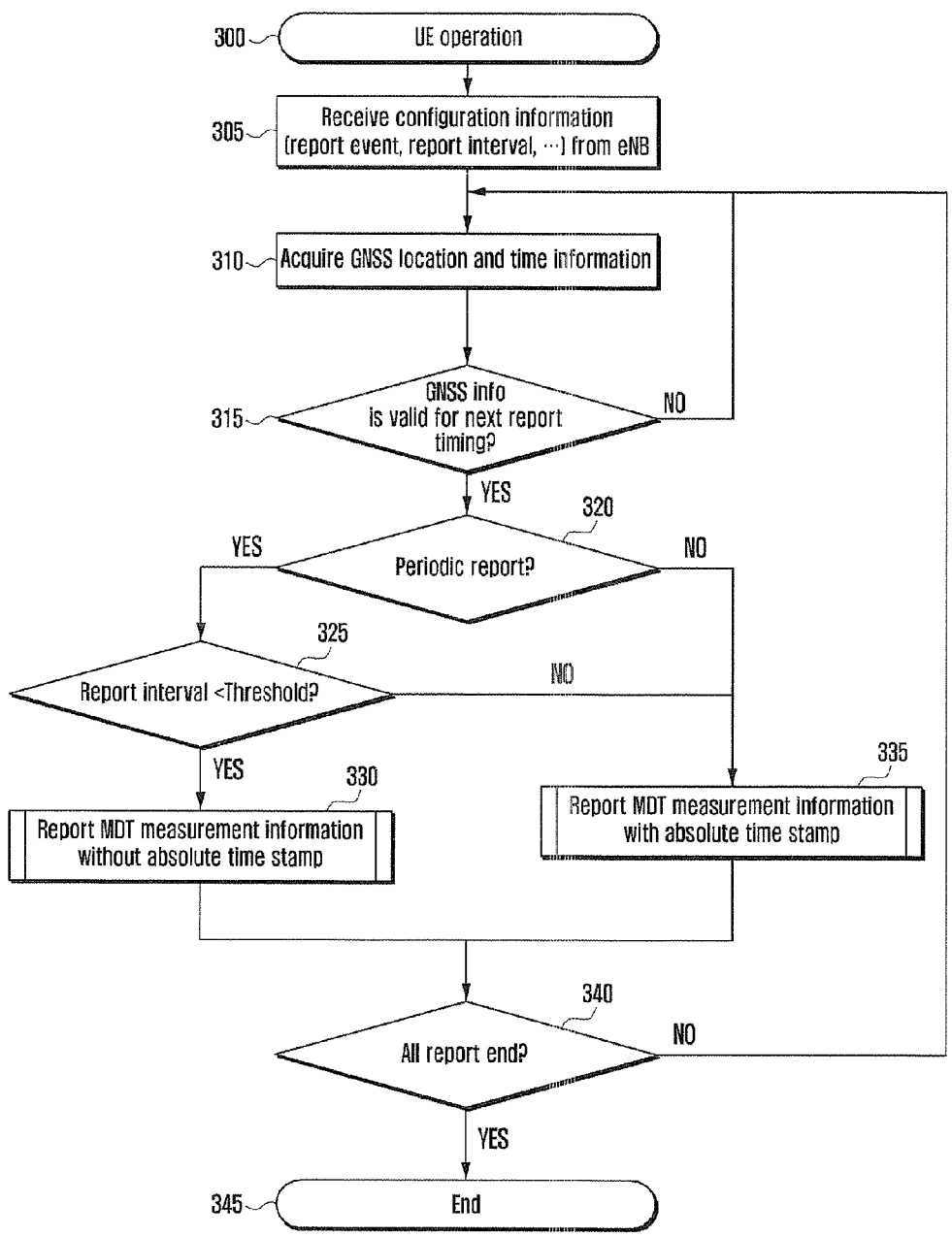
FIG. 3 is a flowchart illustrating the selective time information transmission procedure of the UE according to an embodiment of the disclosure.

FIG. 3 is a flowchart illustrating the selective time information transmission procedure of the UE according to an embodiment of the disclosure.

Referring to FIG. 3, the UE receives MDT configuration information form the eNB at operation 305. The MDT configuration information received from the eNB includes the information necessary for performing MDT. For example, the MDT configuration information may indicate whether to configure the UE with the periodic report or the event-triggered report. In the case of the periodic report, supplementary information such as report interval is further included. In the case of the event-triggered report, the information on event triggering report may be included. Then the UE performs MDT according to the received configuration information at operation 310. The UE reports the MDT measurement information at every report interval and receives GNSS location and time information by means of a GNSS receiver.

Once the location information and time information are acquired, the terminal determines whether the GNSS location information is valid for the next report time at operation 315. If the difference between the GNSS location information acquisition time and report time is great, the UE detects this at operation 315 and returns the procedure to step 310. That is, if the difference of the location information acquisition and report times is greater than a threshold value, the UE skips transmitting the corresponding location information at the next MDT measurement information report timing.

Otherwise, if it is determined that the GNSS location information is valid for the next report time (i.e. if the difference between the GNSS location information acquisition time and report time is not greater than the threshold value) at operation 315, the UE determines whether it is the periodic report at operation 320. If it is the periodic report, the UE compares the report interval with a predetermined threshold at operation 325. At this time, if it is determine that the report interval is less than a predetermined value (report interval<threshold), the UE reports the location information without time information (time stamp) at operation 330.

That is, if it is configured to report the MDT measurement information periodically at a short interval, this means that the probability in which the location indicated by the GNSS location information match the UE location at the report time match and close each other. Accordingly, if the report interval is less than a threshold value, the validity of the location information is guaranteed such that it is possible to report the location information without the time information selectively. The threshold value may be sent by the eNB or defined by the UE. Although the UE uses an internally defined value, the eNB may calculate the tolerable range of the value based on the inclusion/exclusion of the time information and configured report interval. For example, if the UE reports at an interval of 240 ms without time information, it may be determined that the UE uses the threshold value greater than 240 ms. If operation 325 is omitted, the UE reports the location information without time information at every report interval. If a set of report intervals available are all short enough to guarantee the validity of the location information, operation 325 is omitted.

Otherwise, if it is not the periodic report at operation 320 or if the report interval is greater than the threshold (report interval>threshold) at operation 330, the terminal reports the time information to the eNB along with the time information (time stamp) at operation 335. Then the eNB verifies the validity of the location information based on the received time information. After operations 330 and 335, the UE determines whether to continue reporting procedure at operation 340. If the report has been performs completely, the UE terminates the MDT operation at operation 345 and, otherwise, returns the procedure to operation 310.

Embodiment 2

Figure 4:
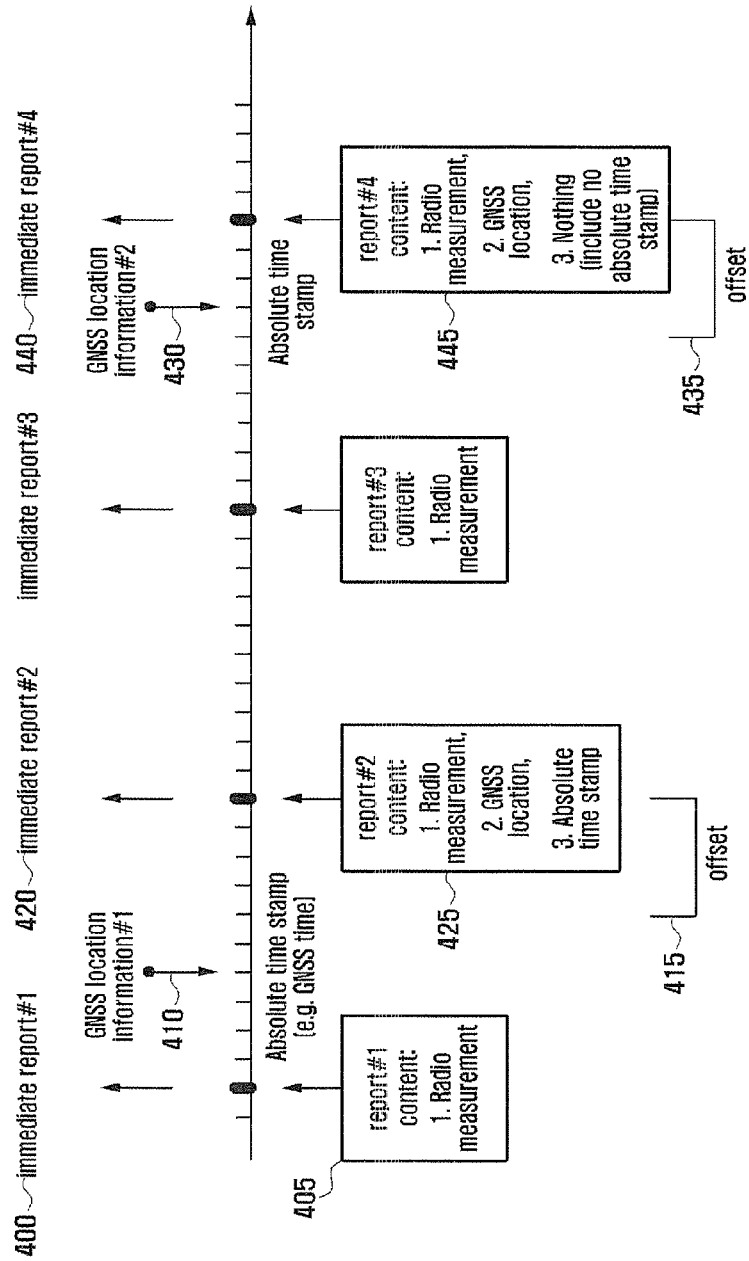
FIG. 4 is a timing diagram illustrating a principle of reporting MDT measurement information according to another embodiment of the disclosure.

The UE may include the time information (time stamp) in the MDT measurement information only when the difference between the location information acquisition and report times is greater than a predetermined value. The predetermined value may be sent by the eNB. FIG. 4 is a timing diagram illustrating a principle of reporting MDT measurement information according to another embodiment of the disclosure. In the embodiment of FIG. 4, the time stamp is included only when the difference between the GNSS location information acquisition timing and report timing is greater than a predetermined value.

Referring to FIG. 4, the UE reports the MDT measurement information to the eNB at an interval as denoted by reference numbers 400, 420 and 440. If there is not GNSS location information, the UE reports the location information as denoted by reference number 405. If GNS location information is not acquired, the UE reports the MDT measurement information without location information. Afterward, the UE acquires the GNSS location information at step 410. The UE verifies the validity of the corresponding location information for next report timing and determines to include the location information in the MDT measurement information at step 420. The UE determines whether to include the time information in the MDT measurement information based on the offset value sent by the eNB as denoted by reference numbers 415 and 435. If the difference between the GNSS location information acquisition time and report time is greater than the offset value, the UE includes the time information in the MDT measurement information. This is because it is not necessary for the eNB to verify the validity of the location information again. Accordingly, the UE reports the MDT measurement information including the signal measurement information, location information, and time information to the eNB.

The UE collects the location information again as denoted by reference number 430. The UE determines that the corresponding location information is valid for the next report timing. Afterward, the UE check the difference between the location information acquisition time and the report time as denoted by reference number 430 and, since the difference between the GNSS location information acquisition time and the report time is equal to or less than the offset value, excludes the time information from the MDT measurement information reported to the eNB as denoted by reference number 440. Accordingly, the UE reports the MDT measurement information without time information as denoted by reference number 455.

Figure 5:
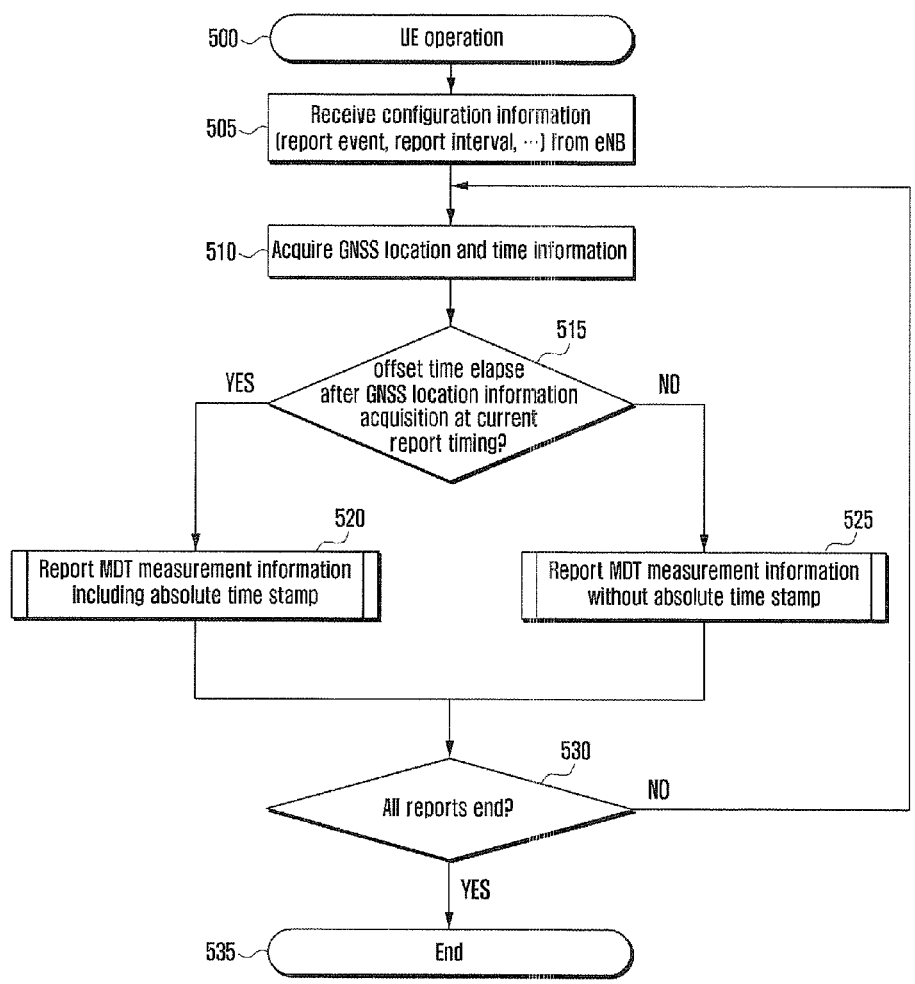
FIG. 5 is a flowchart illustrating selective time information transmission procedure of the UE based on an offset value according to an embodiment of the disclosure.

FIG. 5 is a flowchart illustrating selective time information transmission procedure of the UE based on an offset value according to an embodiment of the disclosure.

Referring to FIG. 5, the UE receives MDT configuration information from the eNB at operation 505. At this time, the MDT configuration information received from the eNB includes the offset value which is used for determining whether to include the time information in the MDT measurement information in association with the difference between the GNSS location information acquisition time and the report time. Here, the time information may indicate the time when the UE acquires the location information. The UE compares the difference between the GNSS location information acquisition time and the report time with the offset to determine whether to report the time information.

The UE acquires the GNSS location information and the time information at operation 510. Afterward, the UE determines whether the difference between the location information acquisition time and the report time is greater than the offset value. If the difference between the location information acquisition time and the report time is equal to or greater than the offset value at operation 515, the UE reports the MDT measurement information including the time information at operation 520. Otherwise, difference between the location information acquisition time and the report time is less than the offset value, the UE reports the med measurement information without time information at operation 525. After operation 520 or 530, the UE determines whether the MDT measurement report has completed at operation 530. If the MDT measurement report has completed, the UE ends the MDT measurement operation and, otherwise, returns the procedure to operation 510.

Embodiment 3

The correlation between the MDT measurement location and the MDT measure information time has a close relationship with the UE's movement speed. Although the difference between the location information acquisition time and the measurement information report time is large, if the UE is not moving, the location indicated by the location information may be regarded as the measurement information acquisition location. In contrast, although the difference between the location information acquisition time and the measurement information report time is small, if the UE is moving fast, the validity of the location information is not reliable. Accordingly, the UE may user the UE speed as one of the conditions for determining whether to include the location information acquisition time in the MDT measurement information.

Figure 6:
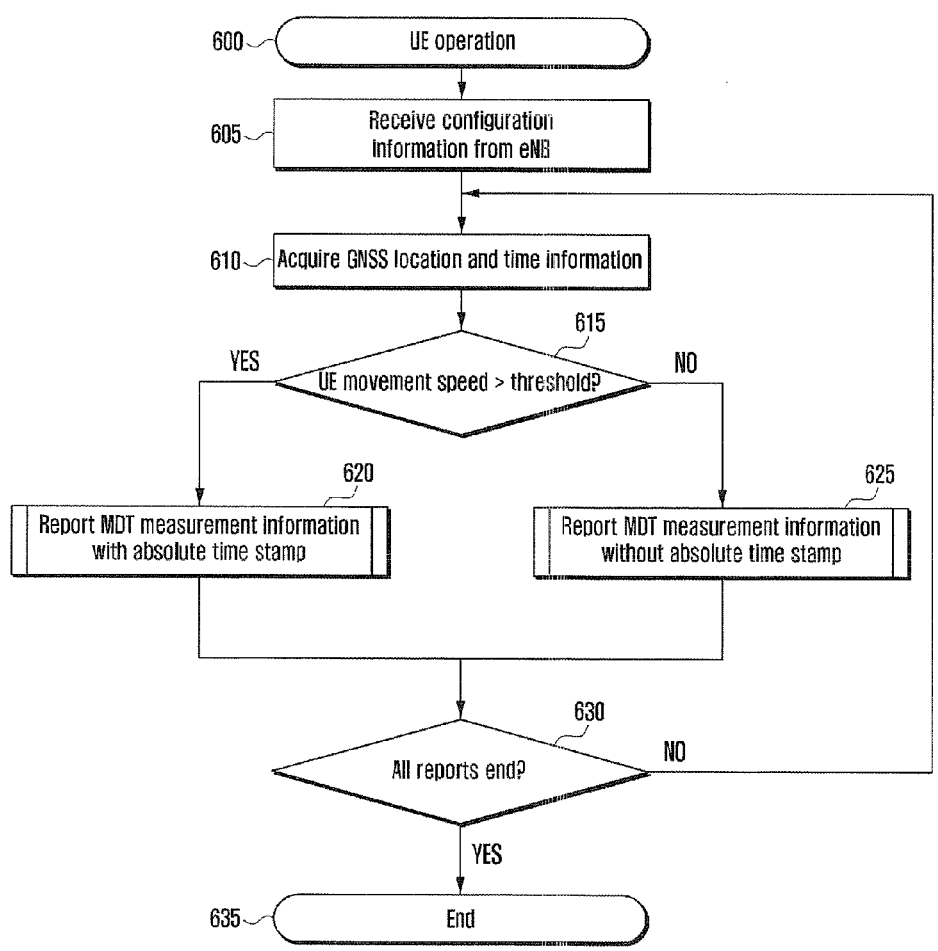
FIG. 6 is a flowchart illustrating the selective time information transmission procedure of the UE based on the UE movement speed according to an embodiment of the disclosure.

FIG. 6 is a flowchart illustrating the selective time information transmission procedure of the UE based on the UE movement speed according to an embodiment of the disclosure.

Referring to FIG. 6, the UE receives MDT configuration information form the eNB at operation 605. Next, the UE collects GNSS location information and time information at operation 610. After collecting the location information and time information, the UE extracts the UE movement speed at step 615 and determines whether the UE speed is higher than a predetermined threshold at operation 615. Here, the threshold may be sent by the eNB or determined by the UE internally. If the UE speed is higher than the threshold, the UE reports the MDT measurement information including the time information at operation 620. Otherwise, if the UE speed is equal to or lower than the threshold, the UE reports the MDT measurement information without time information at operation 625. After operation 620 or 625, the UE determines whether the MDT measurement information has reported completely at operation 630. If the MDT measurement information has reported completely, the UE terminates the MDT operation and, otherwise, returns the procedure to step 610 to repeat met measurement and report operation.

Although the descriptions have been made of the embodiments 1 to 3 separately, the MDT measurement and report operation may be performed in any combination of the procedures of embodiments (embodiment 1+embodiment 2, embodiment 1+embodiment 3, embodiment 2+embodiment 3, and embodiment 1+embodiment 2+embodiment 3). In an exemplary case of applying the embodiments 2 and 3, the time information is included in the MDT measurement information only when the time difference is greater than offset value and when the UE speed is higher than the threshold.

Embodiment 4

The method for reducing the overhead of the time information included in the MDT measurement information is to reduce the size of the time information. An embodiment of the disclosure defines an efficient time information size or proposes a method for providing the time information in a new aspect.

The time information required for verifying the validity of the location information is not necessary to indicate a long time. If the report time arrives after the elapse of the long time since the location information acquisition time, the corresponding location information is likely to be determined as invalid information so as to be discarded by the UE. Accordingly, it is not necessary for the time information of the MDT measurement information to indicate a long time. If it is possible to indicate the time in unit of minute, this size is enough. The size of the time information as expressed by formula (1) is long enough to indicate minute and second.

$$MM:SS(16 \text{ bits}) \quad (1)$$

The time information as formula (1) saves the absolute minute and second values in the form of MM and SS when the location information is acquired. Under the assumption that the difference between the absolute time at the reporting timing and location information acquisition time is less than 1 hour, the eNB is capable of calculating the location information acquisition time along with MM:SS.

Figure 7:
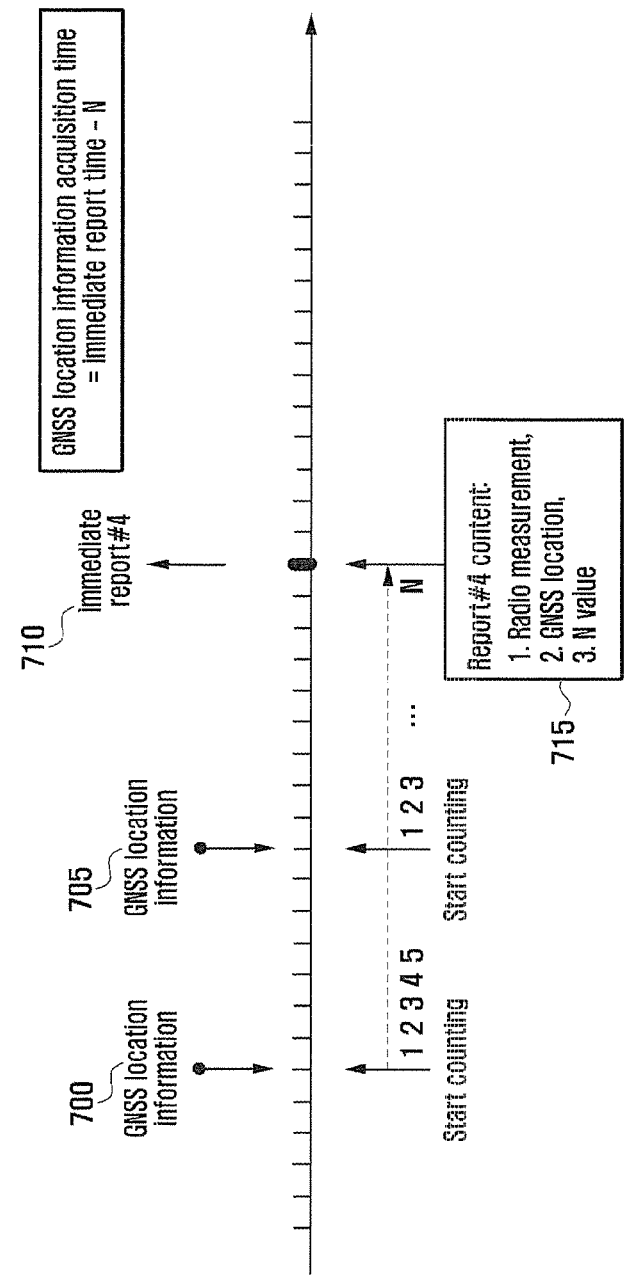
FIG. 7 is a timing diagram illustrating a principle of reporting the location information acquisition time using a counter.

Another method for reducing the time information overhead is to count time at the instant of acquiring the location information. FIG. 7 is a timing diagram illustrating a principle of reporting the location information acquisition time using a counter.

Referring to FIG. 7, the UE acquires GNSS location information at operation 700 and starts a counter at the time when the location information is acquired. The counter operates to increment the count value at a predetermined time interval. For example, the interval may be set to 1 second to increment the count by 1 at every 1 second. However, if new location information is acquired at timing 705 before reporting the location information acquired at timing 700, the location information acquired previously is deleted and new location information is stored. At this time, the counter counting the location information acquisition time is initialized (i.e. reset) to recount the newly configured location information acquisition time. This is because the most recently acquired location information indicates more correct location. The UE starts the counter at the time when the location information is acquired, initializes the counter when new location information is acquired before transmitting the previous location information, and restarts the counter. Accordingly, the counter maintains the time information indicating the most recent location information acquisition time when the MDT measurement information is reported to the eNB.

If the next report timing arrives as denoted by reference number 710, the UE reports the MDT measurement information including the counter value N as denoted by reference number 715. At this time, the eNB knows the absolute time of the report timing 710. Accordingly, the location acquisition time can be calculated by subtracting the time indicated by the counter value N from the absolute time. This method requires relatively small number of bits to indicate the same time. As the counting interval of the counter becomes longer, the number of bits for indicating a certain time decreases. For example, if the counting interval of the counter is 1 second, 12 bits are enough to indicate 1 hour. If the counting interval is 2 seconds, the number of bits for indicating 1 hour is reduced to half.

Figure 8:
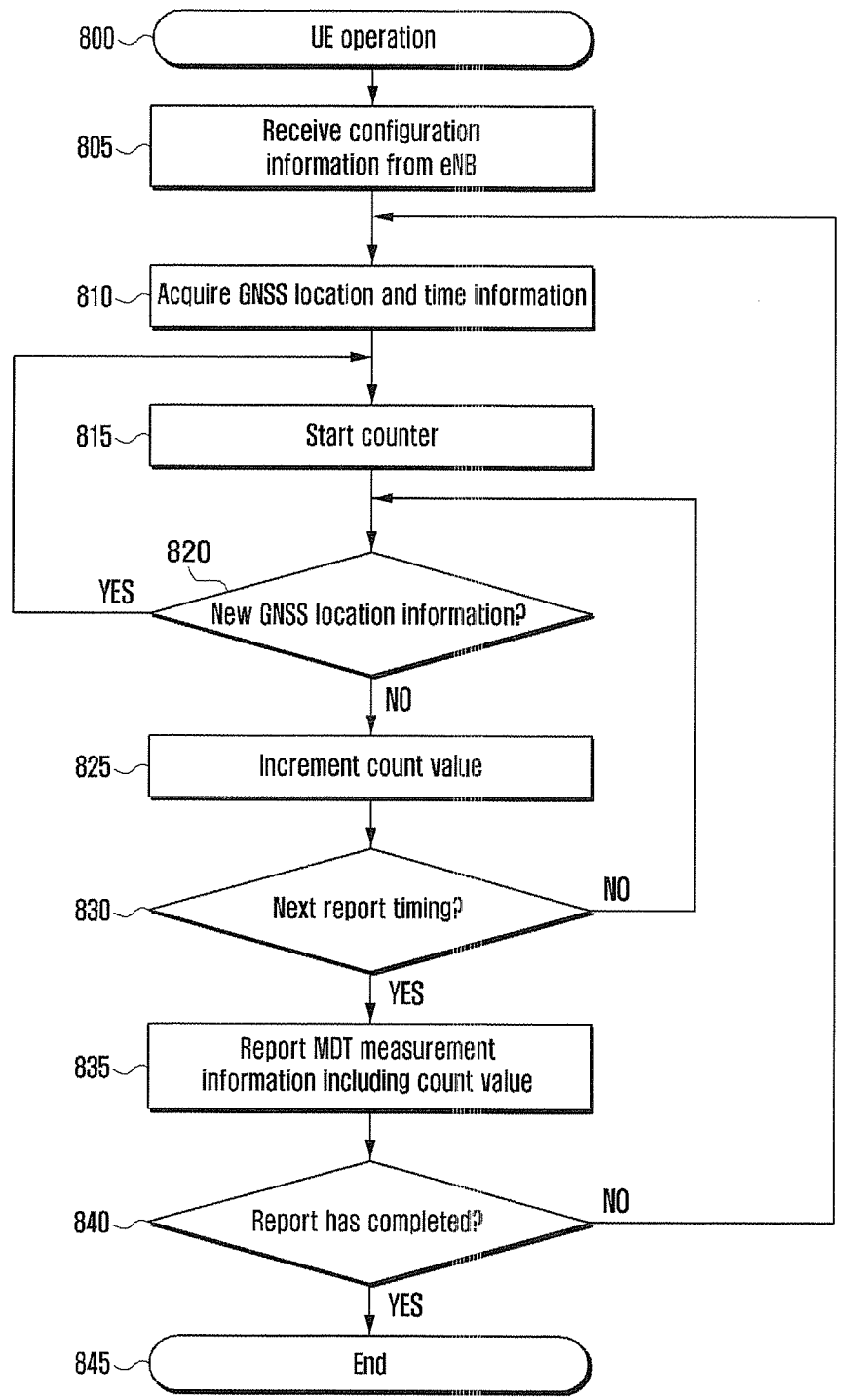
FIG. 8 is a flowchart illustrating a method for calculating location information acquisition time using a counter according to an embodiment of the disclosure.

FIG. 8 is a flowchart illustrating a method for calculating location information acquisition time using a counter in the case of FIG. 7 according to an embodiment of the disclosure.

Referring to FIG. 8, the UE receives the MDT configuration information from the eNB at operation 805. Next, the UE collects GNSS location information at operation 810 and starts a counter to generate the location information collection time information at operation 815. If new GNSS location information is collected (i.e. if new location information is acquired before transmitting the MDT measurement information including the location information acquired previously) at operation 820, the UE returns the procedure to operation 815 and initializes the previous count value to restart the counter. Otherwise if no new GNSS location information is collected, the UE increment the count value as much as a predetermined counting interval at step 825. In the state of counting the GNS location information collection time, the UE determines whether the next report timing arrives at step 830. If it is not the MDT measurement information report timing yet, the UE returns the procedure to step 820 to increase the counter as time goes. Otherwise, if the MDT measurement information reporting timing arrives, the UE reports the MDT measurement information including the count value at step 835. Next, the UE determines whether the MDT measurement information report has completed at operation 840. If the MDT measurement information report has completed, the UE terminates the MDT measurement information report procedure and, otherwise, returns the procedure to step 810.

Figure 9:
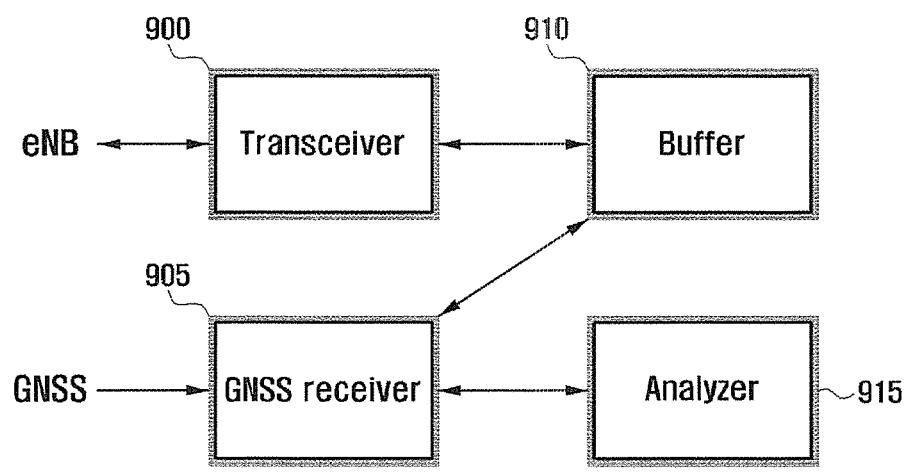
FIG. 9 is a block diagram illustrating a configuration of the UE according to an embodiment of the disclosure.

FIG. 9 is a block diagram illustrating a configuration of the UE according to an embodiment of the disclosure.

Referring to FIG. 9, the transceiver 900 receives the MDT configuration information from the eNB and measures channel signals. That is, the transceiver 990 includes a transmitter for transmitting the signal of the UE and a receiver for receiving the signal transmitted by the eNB. In an embodiment of the disclosure, the receiver receives the MDT configuration information transmitted by the eNB and may include a reception signal measurement unit for generating signal measurement value for MDT measurement. The transmitter is responsible for transmitting the MDT measurement information generated at the report timing.

The buffer 910 stores the information (MDT configuration information and radio measurements) received by the transceiver and the MDT measurement information to be transmitted to the eNB. The GNSS receiver 905 acquires the UE location and time information from the satellite signals. The acquired information is buffered in the buffer 910.

The analyzer (or controller) 915 analyzes the time information to determine whether to include the time information in the MDT measurement information. In more detail, the analyzer controls receiving configuration information from the eNB for radio channel measurement, acquiring radio channel information, UE location information, and location information collection time, determining validity of UE location information, generating, if valid, the channel measurement information including the time information, and transmitting the channel measurement information to the eNB.

In detail, the channel analyzer 915 determines whether the MDT measurement information includes the time information. In the first method, if the MDT measurement report period is less than a predetermined value (first threshold), this means that the location information validity is low and thus reports the location information without time information selectively. In the second method, the UE includes the time information in the MDT measurement information only when the difference between the GNSS location information acquisition time and the report time is equal to or greater than a predetermined value (second threshold. In the third method, the location information acquisition time is included in the MDT measurement information only when the UE's movement speed is greater than a third threshold.

The GNSS receiver 905 may reduce the size of the time information included in the MDT measurement information according to an embodiment of the disclosure. In the first method, the GNSS receiver 905 generates the time information with minute and second values (MM:SS) at the time when the location information is acquired. In the second method, the GNSS receiver 905 starts counting at the time when the location information is acquired, and the counter continues counting until the MDT measurement information is reported. That is, the second method is to use the value counted from location information acquisition time to the MDT reporting time as the time information.

Although preferred embodiments of the invention have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the invention.

The invention claimed is:

1. A method to report channel measurement information by a terminal in a wireless communication system, the method comprising:
   receiving configuration information for a radio channel measurement from a base station;
   acquiring radio channel information, terminal location information, and location information acquisition time information according to the configuration information;
   determining whether a validity of the terminal location information is guaranteed; and
   transmitting the channel measurement information including the location information acquisition time information to the base station if the validity of the terminal location information is determined not to be guaranteed.

2. The method of claim 1, wherein determining whether the validity of the terminal location information is guaranteed comprises:
   comparing a channel measurement information report period and a first threshold value; and
   determining, when the channel measurement information report period is smaller than the first threshold value, that the validity of the terminal location information is guaranteed.

3. The method of claim 1, wherein determining whether the validity of the terminal location information is guaranteed comprises:
   comparing the location information acquisition time with channel measurement information report time; and
   determining, when a difference between the location information acquisition time and the channel measurement information report time is smaller than a second threshold, that the validity of the terminal location information is guaranteed.

4. The method of claim 1, wherein determining whether the validity of the terminal location information is guaranteed comprises:
   comparing a terminal movement speed with a third threshold; and
   determining, when the terminal movement speed is smaller than the third threshold, that the validity of the terminal location information is guaranteed.

5. The method of claim 1, further comprising transmitting the channel measurement information without the location information acquisition time information to the base station if the validity of the terminal location information is determined to be guaranteed.

6. The method of claim 1, further comprising:
   incrementing a counter in response to the acquisition of terminal location information.

7. The method of claim 6, further comprising:
   including a value of the counter in the channel measurement information when a measurement information reporting timing has arrived.

8. The method of claim 7, further comprising:
   restarting the value of the counter in response to a new acquisition of the terminal location information.

9. The method of claim 1, wherein the channel measurement information is Minimization of Drive Test (MDT) channel measurement information.

10. The method of claim 1, wherein the location information acquisition time information is Global Navigation Satellite Systems (GNSS) location information acquisition time.

11. A terminal to report channel measurement information in a wireless communication system, the terminal comprising:
    a transceiver configured to transmit and receive signals to and from a base station; and
    a controller configured to:
       control an acquisition of radio channel information, terminal location information, and location information acquisition time information according to configuration information received from the base station,
       determine whether validity of the terminal location information is guaranteed; and
       transmit the channel measurement information including the location information acquisition time information to the base station if the validity of the terminal location information is determined not to be guaranteed.

12. The terminal of claim 11, wherein the controller is configured to compare a channel measurement information report period and a first threshold value and determine, when the channel measurement information report period is smaller than the first threshold value, that the validity of the terminal location information is guaranteed.

13. The terminal of claim 11, wherein the controller is configured to compare the location information acquisition time with a channel measurement information report time and determine, when a difference between the location information acquisition time and the channel measurement information report time is smaller than a second threshold, that the validity of the terminal location information is guaranteed.

14. The terminal of claim 11, wherein the controller is configured to compare a terminal movement speed with a third threshold and determine, when the terminal movement speed is smaller than the third threshold, that the validity of the terminal location information is guaranteed.

15. The terminal of claim 11, wherein the controller is configured to control transmitting the channel measurement information without the location information acquisition time information to the base station if the validity of the terminal location information is determined to be guaranteed.

16. The terminal of claim 11, wherein the controller is configured to increment a counter in response to the acquisition of the terminal location information.

17. The terminal of claim 16, wherein the controller is configured to include a value of the counter in the channel measurement information when a measurement information reporting timing has arrived.

18. The terminal of claim 17, wherein the controller is configured to restart the value of the counter in response to a new acquisition of the terminal location information.

19. The terminal of claim 11, wherein the channel measurement information is Minimization of Drive Test (MDT) channel measurement information.

20. The terminal of claim 11, wherein the location information acquisition time information is Global Navigation Satellite Systems (GNSS) location information acquisition time.

* * * * *